(12) United States Patent
Kearney et al.

(10) Patent No.: US 7,181,965 B2
(45) Date of Patent: Feb. 27, 2007

(54) SELF-HEATED LIQUID LEVEL SENSOR

(75) Inventors: Daniel J. Kearney, Ulster Park, NY (US); Randy J. Zoodsma, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 119 days.

(21) Appl. No.: 11/017,604

(22) Filed: Dec. 20, 2004

(65) Prior Publication Data

US 2006/0133448 A1    Jun. 22, 2006

(51) Int. Cl.
*G01K 7/22* (2006.01)
*G01F 23/22* (2006.01)

(52) U.S. Cl. .................. 73/295; 374/183; 374/54

(58) Field of Classification Search .................. 374/54, 374/4; 340/603, 618, 612, 622; 73/295, 73/204
See application file for complete search history.

(56) References Cited

U.S. PATENT DOCUMENTS

| | | | | |
|---|---|---|---|---|
| 2,911,828 | A * | 11/1959 | Keating et al. | ........... 73/290 R |
| 3,955,416 | A | 5/1976 | Waiwood | ..................... 73/295 |
| 4,564,834 | A * | 1/1986 | Steele | ........................ 340/622 |
| 5,178,009 | A * | 1/1993 | Arekapudi et al. | ........... 73/292 |
| 5,249,431 | A | 10/1993 | Kuribara et al. | ............... 62/129 |
| 5,637,789 | A * | 6/1997 | Lawson | .................... 73/40.5 R |
| 5,910,189 | A * | 6/1999 | Suzuki et al. | ................. 73/295 |
| 5,929,754 | A * | 7/1999 | Park et al. | ..................... 340/439 |
| 6,662,650 | B1 | 12/2003 | Durkee et al. | ................. 73/295 |
| 6,758,084 | B2 | 7/2004 | Hall | .............................. 73/73 |
| 2001/0015100 | A1* | 8/2001 | Schimmel et al. | ............ 73/295 |
| 2003/0046997 | A1* | 3/2003 | Waller | ........................ 73/295 |

FOREIGN PATENT DOCUMENTS

| | | |
|---|---|---|
| GB | 1466270 A | 3/1977 |
| JP | 59148826 A | 8/1984 |
| JP | 60194319 A | 10/1985 |

OTHER PUBLICATIONS

"Multifunction Liquid Level and Leak Monitor," [online]; https://www.delphion.com;tdbs/tdb?o=71C%2001118; Apr. 1971.

* cited by examiner

*Primary Examiner*—Diego Gutierrez
*Assistant Examiner*—Oxana Maslova
(74) *Attorney, Agent, or Firm*—Cantor Colburn LLP

(57) ABSTRACT

A liquid level sensor comprising a thermistor probe and a power source connected to the thermistor probe to heat the thermistor probe. A cover encases the thermistor probe and includes openings allowing liquid to enter and exit an interior of the cover and contact the thermistor probe. A detector detects a liquid level in response to a voltage at the thermistor probe.

5 Claims, 3 Drawing Sheets

SELF-HEATED LIQUID LEVEL SENSOR

BACKGROUND

The invention relates generally to liquid level sensing and in particular, to sensing the liquid level in a reservoir with turbulent liquid flows. Liquid level sensing in a reservoir with turbulent flow presents problems of false level indication due to splashing and induced turbulent airflow above the liquid. Other errors can be induced due to tilting of the reservoir. Many technologies for liquid level sensing have been used in the past. Mechanical floats/switches have been used but are subject to error if installed improperly where the float does not move as desired due to orientation or fouling. Also being a mechanical switch, it is more subject to shipping stress. Other liquid level sensing devices not sensitive to mechanical shipping stress include solid-state components such as optical or conductive means of sensing liquid. But these devices may also be subject to errors due to local fouling of the sensor. A further method of sensing liquid level in a reservoir is by thermal means or more particularly using externally heated or self-heated thermistors. Many liquid level sensing schemes using self-heated thermistors also require a reference temperature to compare to or other external reference processing to determine if the liquid is truly at the sensor or not.

SUMMARY OF THE INVENTION

An embodiment of the invention is a liquid level sensor comprising a thermistor probe and a power source connected to the thermistor probe to heat the thermistor probe. A cover encases the thermistor probe and includes openings allowing liquid to enter and exit an interior of the cover and contact the thermistor probe. A detector detects a liquid level in response to a voltage at the thermistor probe.

DETAILED DESCRIPTION

Figure 1:
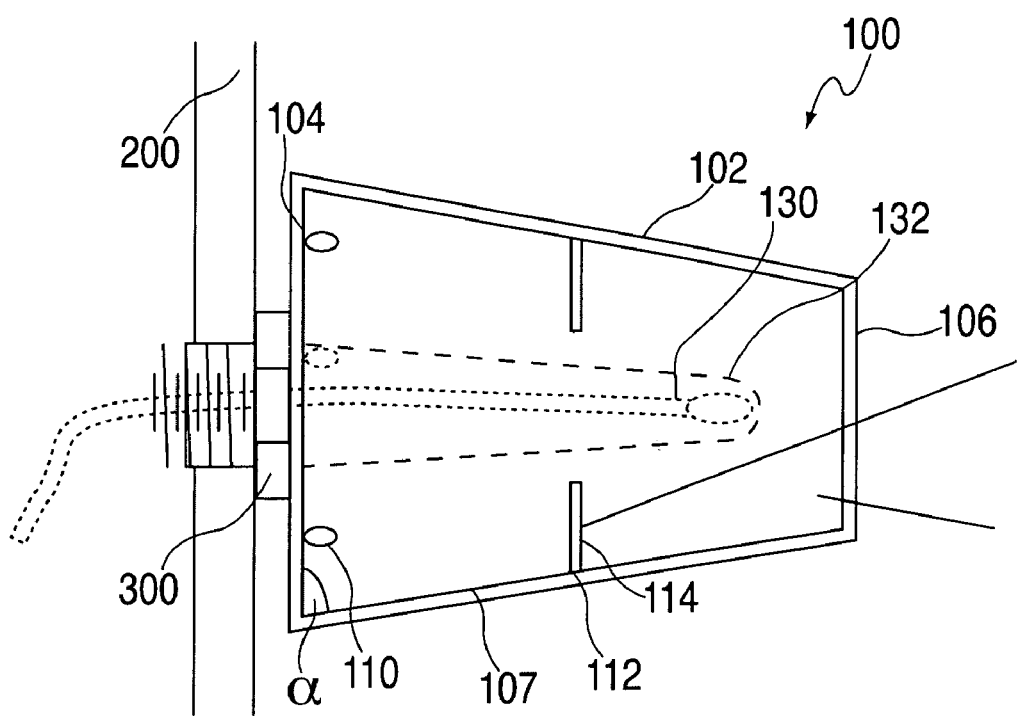
FIG. 1 is a cross-sectional view of a liquid level sensor in an embodiment of the invention.

FIG. 1 is a cross-sectional view of a liquid level sensor 100 in an embodiment of the invention. The liquid level sensor 100 is depicted within a tank wall 200 of a tank containing liquid for which liquid level sensing is desired. A nut 300 is positioned within the tank to secure the liquid level sensor 100 to the tank wall. This mounting is referred to as an internal installation as the nut 300 is located within the tank wall 200. As described in more detail herein, the liquid level sensor 100 uses a self-heated probe and detects liquid level based on the temperature difference between the liquid and ambient air. When liquid is in contact with the probe tip, this condition is detected. Thus, it is desirable to eliminate cooling of the probe by sources other than the liquid level rising.

The liquid level sensor 100 includes a cover 102 that is frusto-conical having a wider base 104 positioned close to wall 200 and a smaller top 106 distanced from the wall 200. An angle α between the base 104 and the side wall 107 is selected so that even if the tank is tilted, liquid will still drain out of the cover 102. Thus, the pitch α of side wall 107 is selected to be greater than a maximum tilt of the tank. Cover 102 need not be frusto-conical. Other shapes may be used for cover 102 as long as the bottom surface of the cover slopes downward to promote drainage of liquid out of the cover 102.

Openings 110 are formed in the side wall 107 of the cover 102 near the base 104. The openings 110 allow liquid to enter the cover 102 with rising liquid levels, and exit the cover 102 upon falling liquid levels. A plurality of openings 110 are formed in the cover 102 positioned radially around the longitudinal axis of cover 102. This ensures that at least one opening is below and above the thermistor probe 130 without having to install the cover 102 in a particular orientation. Holes are used below and above the probe 130 to prevent air pockets from developing around the probe that would cause malfunction. Air, particularly around the probe tip, could be trapped in cover 102 even though the cover 102 is entirely submerged in liquid. It is acceptable to have small air pockets near the mounting end of the probe near the ingress/egress holes 110. Furthermore, there may be liquid pooled away from the probe tip after liquid has entered cover 102 and then receded. In the embodiment shown in FIG. 1, three openings 110 are used, spaced 120 degrees apart on the cover 102.

One or more ribs 112 may be formed within cover 102 extending inwardly towards the longitudinal axis of the cover, parallel to the base 104. The rib 112 provides structural support to the cover 102 and disrupts airflow through openings 110 from reaching probe 130. In an embodiment of the invention, the probe 130 is a thermistor such as that provided by US Sensors NTC, part number PS102J2. As the liquid level sensor 100 detects liquid level based on temperature, it is desirable to prevent cooling of the thermistor probe 130 by means other than liquid. Multiple ribs may be used to further torture airflow within the cover 102. Rib 112 also include openings 114 to allow liquid to escape cover 102 upon falling liquid levels. Openings 114 may be positioned near the junction of rib 112 and side wall 107 and be positioned 120 degrees relative to each other. Cover 102 may be made from an infrared reflective plastic material or coated to reflect infrared energy.

Within cover 102 is a probe 130 contained within a sheath 132. The sheath 132 may be made from plastic and is used to support the probe 130 for mechanical mounting, provide a thermal path (high impedance to mounting) and provide electrical isolation from contaminating effects of liquid on thermistor probe 130. The electrical leads to thermistor probe 130 need isolation from liquid to avoid incorrect resistance values that could yield malfunction. The sheath 132 may be a solid plastic part drilled out almost to the end so that the thermistor probe 130 is fully inserted in sheath 132. The sheath may then be back-filled with epoxy. The probe 130 is a thermistor operating in a self-heat mode. The thermistor has two wires, which are connected to ground and a power source as described herein with reference to FIG. 3.

Figure 3:
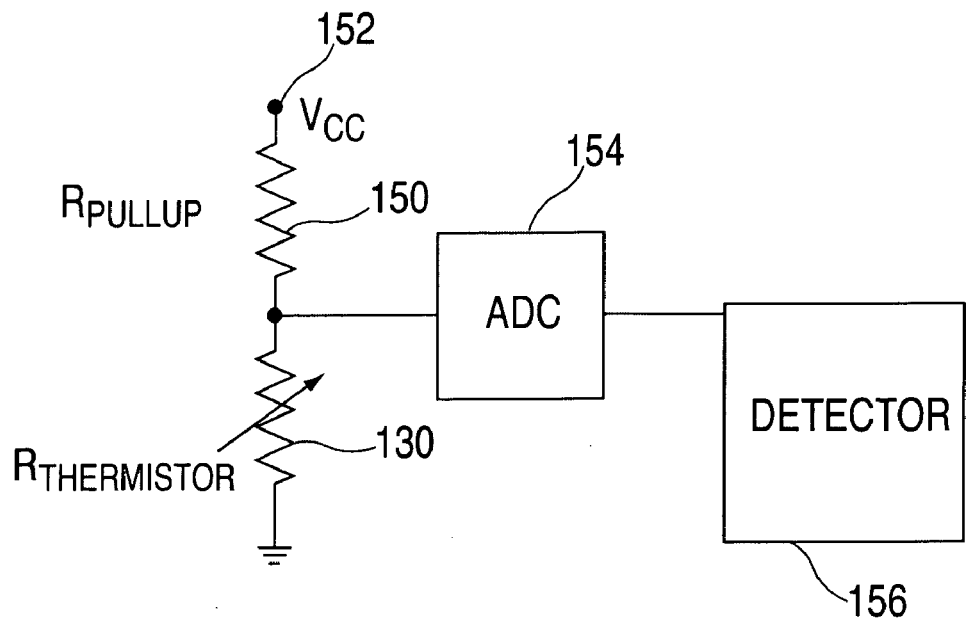
FIG. 3 is a schematic diagram of components in an embodiment of the invention.

As shown in FIG. 3, the thermistor probe 130 is connected to a power source 152 through a pull up resistor 150. The power source may be battery. The voltage over the thermistor probe 130 is received by and analog-to-digital converter 154 which outputs a digital representation of the thermistor voltage. This digital value may be used to derive a temperature of the thermistor which indicates whether the liquid is above or below the probe 130. A detector 156 receives the output of the analog-to-digital converter 154 and determines if the thermistor probe 130 is in the liquid based on the magnitude of the digital value. The detector may include a lookup table to output a probe temperature.

Figure 5:
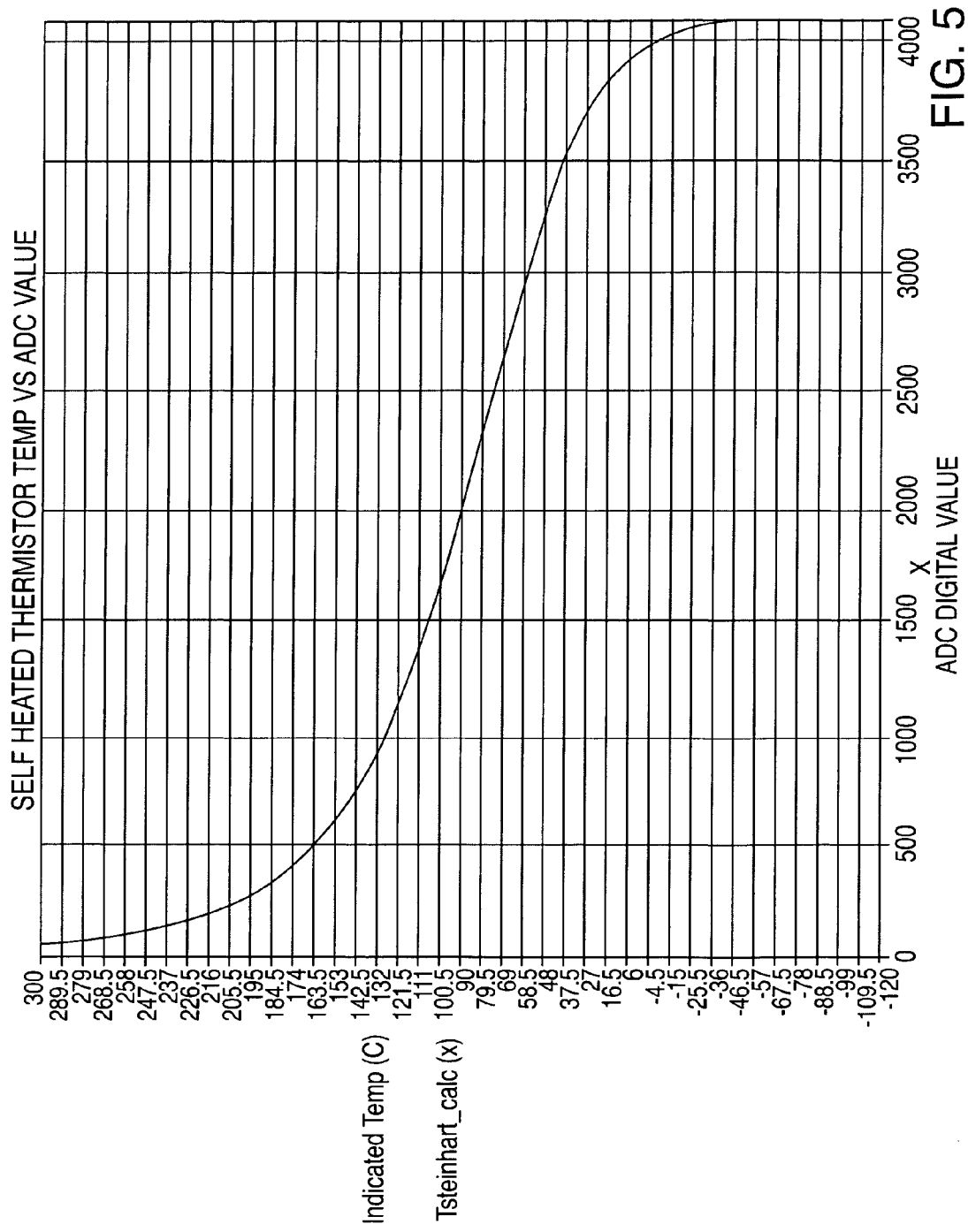
FIG. 5 is a plot of temperature versus ADC values in an embodiment of the invention.

In operation, the power source voltage, pull-up resistor value and thermistor resistance value are selected so that a detectable change in voltage over the thermistor probe 130 occurs when the probe tip transitions from air to liquid. For example, the thermistor probe 130 may be selected so that the voltage at ADC 154 is 2 volts when the probe is above the liquid. As the liquid rises and comes in contact with the tip of probe 130, the thermistor cools, causing an increase in resistance and a corresponding increase in voltage at ADC 154. By detecting this rise in voltage, the presence of liquid at the probe tip is detected. When the liquid recedes and exits the cover 102, the thermistor warms, decreasing resistance and the voltage at ADC 154 decreases. This relationship is depicted in FIG. 5, which is a plot of temperature versus ADC value, when Vcc is 5V, Rpullup is 100 ohms and the thermistor is US Sensors part number PS102J2.

Figure 2:
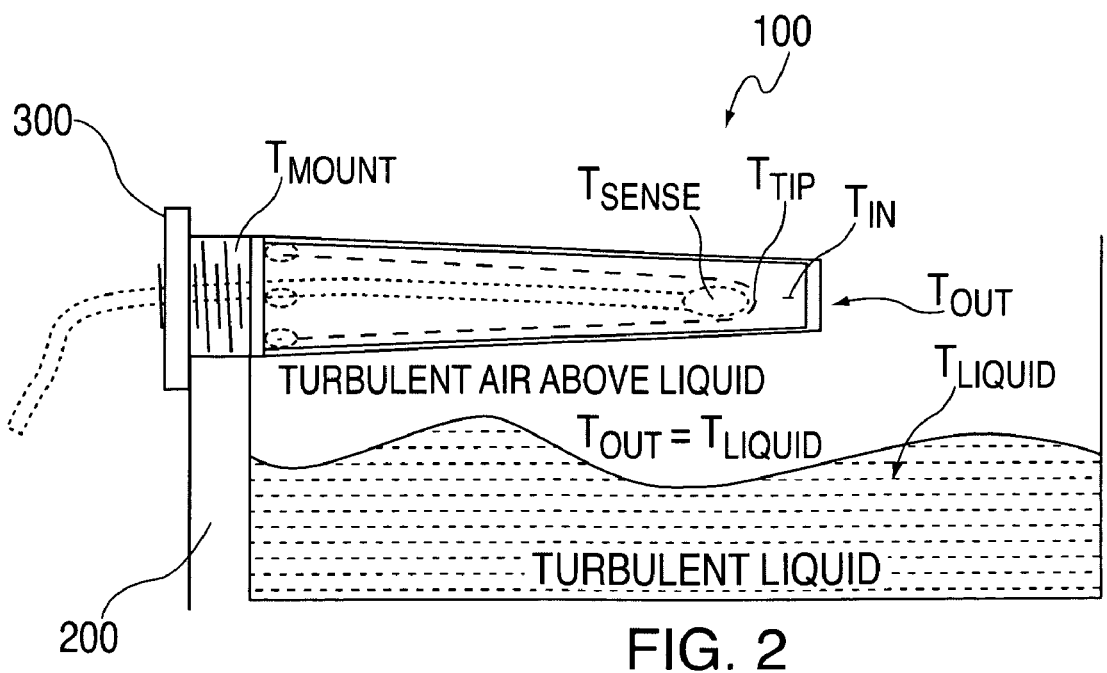
FIG. 2 is a cross-sectional view of a liquid level sensor in an alternate embodiment of the invention.

As shown in FIG. 2, the liquid may be turbulent. In embodiments of the invention, the liquid temperature is regulated at a specific temperature. Cover 102 prevents false readings of liquid level due to splashing of the liquid or convection cooling due to the cooler liquid temperature. The cover 102 prevents liquid from contacting the probe 130 due to splashing. The cover also may include internal circular ribs to prevent convection air cooling through openings 110. Thus, cooling of the probe tip occurs due to liquid level change rather than other conditions that may cause a false indication of liquid level rise or turbulent airflow near the sensor.

Figure 4:
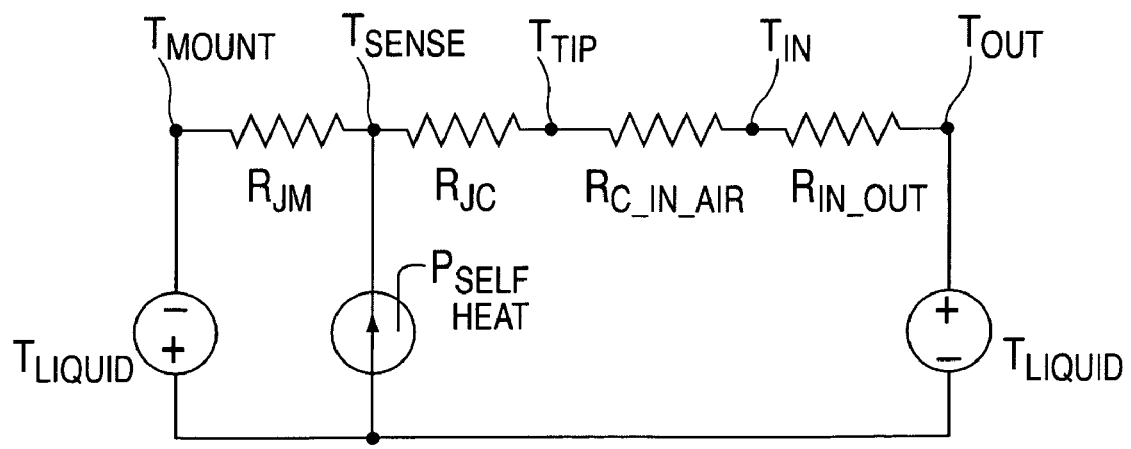
FIG. 4 is thermal model of the liquid level sensor in an embodiment of the invention.

FIG. 4 is a thermal model of the liquid level sensor 100. The resistance elements represent resistance to thermal conduction or thermal impedance. Rjm represents thermal impedance between the mounted end of the probe and the sense location of the probe, i.e., the location of the thermistor. This value is very large by virtue of the long probe length and material conductivity of the probe. Rjc represents thermal impedance from the sense location of the thermistor within the probe to the tip of the probe. This value is very small due to the very short distance between the thermistor and the probe tip. Rin_out represents thermal impedance between the inside surface of the cover top 106 to the outside surface of the cover top 106.

Rc_in_air represents that thermal impedance between the tip of the probe to the inside surface of the cover tip 106. This value is of interest as this value will change when the liquid level rises and enters cover 102. When the probe tip is in air, Rc_in_air has a large value. Conversely, when liquid enters the cover 102 and reaches the level of the probe tip, Rc_in_liq has a small value, due to the conductivity of liquid versus air. This configuration allows the probe tip to be air insulated when the liquid is not at or above the probe tip. When the liquid is at or above the probe tip, the probe tip is set to the liquid temperature causing a change in voltage at the thermistor as described above.

The system detects liquid level based on the voltage over the thermistor probe. A range of voltages may indicate that the probe 130 is in air to account for variations in the ambient air temperature. Another range of voltages indicates that the probe is in the liquid. The values of the thermistor and power source are selected so that the air voltage range and the liquid voltage are sufficiently distinguishable for a given range of liquid and air temperatures.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

What is claimed is:

1. A liquid level sensor comprising:
   a thermistor probe;
   a power source connected to the thermistor probe to heat the thermistor probe;
   a cover encasing the thermistor probe, the cover including openings allowing liquid to enter and exit an interior of the cover and contact the thermistor probe;
   a detector detecting a liquid level in response to a voltage at the thermistor probe;
   wherein the cover includes a circular rib formed on an interior surface of the cover, the rib extending toward a longitudinal axis of the cover;
   the rib includes an opening for allowing liquid to pass through the rib.

2. The liquid level sensor of claim 1 wherein:
   the cover is frusto conical.

3. The liquid level sensor of claim 1 wherein:
   the cover has a bottom sidewall having a pitch to drain liquid from the cover.

4. The liquid level sensor of claim 1 wherein:
   further comprising an analog-to-digital converter generating a digital value from the thermistor voltage and providing the digital value to the detector.

5. The liquid level sensor of claim 4 wherein:
   the detector includes a look-up table to output a temperature based on the digital value.

* * * * *